United States Patent [19]

Robbins et al.

[11] Patent Number: 4,808,350

[45] Date of Patent: Feb. 28, 1989

[54] LIQUID DISTRIBUTOR APPARATUS FOR HIGH TURNDOWN RATIOS AND MINIMUM FOULING

[75] Inventors: Lanny A. Robbins; George R. Killat, both of Midland, Mich.

[73] Assignee: The Dow Chemical Company, Midland, Mich.

[21] Appl. No.: 89,718

[22] Filed: Aug. 26, 1987

[51] Int. Cl.$^4$ ............................................. B01F 3/04
[52] U.S. Cl. ..................................... 261/96; 261/97; 422/195; 422/220
[58] Field of Search ................ 261/96, 97, 113, 114.2, 261/114.3, 114.4; 422/220, 195; 202/158, 232

[56] References Cited

U.S. PATENT DOCUMENTS

| | | | |
|---|---|---|---|
| 2,898,292 | 8/1959 | Halik et al. | 422/220 X |
| 3,392,966 | 7/1968 | Eckert | 261/97 |
| 4,427,605 | 1/1984 | Meier et al. | 202/158 X |
| 4,472,325 | 9/1984 | Robbins | 261/96 |

FOREIGN PATENT DOCUMENTS

| | | | |
|---|---|---|---|
| 16067 | 4/1904 | Fed. Rep. of Germany | 261/113 |
| 539596 | 2/1977 | U.S.S.R. | 261/97 |

Primary Examiner—Richard L. Chiesa
Attorney, Agent, or Firm—Barbara J. Sutherland

[57] ABSTRACT

An improvement in an apparatus for distributing a downflowing liquid uniformly across the packed bed of a vapor-liquid contact column is disclosed. The improvement comprises a predistributor which comprises a plate and an upstanding wall member along one edge. This wall member defines the periphery of the plate such that an open-top compartment is formed. A plurality of drip tubes is installed in the compartment and are defined by upstanding tubular members which extend above and below the plate and which are fastened to the plate, each drip tube having a lengthwise slot extending from the top of the drip tube. The apparatus also comprises a lower distributor unit, which can be of a conventional design or substantially similar to the upper distributor unit, except with additional wall members define separate, open-top compartments. The predistributor and lower distributor unit are mounted horizontally inside the column above the packed bed, such that the predistributor unit is oriented above the lower distributor unit, and at least one of the predistributor unit's drip tubes is in liquid connection with the lower unit. The downflowing liquid enters the predistributor unit through a standpipe conduit, flows through the drip tubes of the predistributor into the lower distributor, then continues through the lower distributor unit downwardly onto the packing.

28 Claims, 3 Drawing Sheets

LIQUID DISTRIBUTOR APPARATUS FOR HIGH TURNDOWN RATIOS AND MINIMUM FOULING

BACKGROUND OF THE INVENTION

The invention relates to an apparatus for distributing a liquid across a packed bed of a vapor-liquid contact column.

Packed columns for vapor-liquid contact are used in various operations, such as distillation, fractionation, absorption, stripping and heat exchange. The columns are usually filled with packing material that is randomly-oriented. However, on occasion the packing material is carefully positioned. The columns are usually used in operations involving counter-current flow of the vapor and liquids in the column, but are suitable for uses involving co-current flows as well.

Different applications indicate the use of differing packing arrangements and differing means of distributing the liquid onto the packing. For example, operations requiring less than thirty linear feet of packing and no intermediate feed or takeoff streams generally require a column having only a single bed of packing therein, and one device for distributing the liquid onto the packing. In these columns the device is mounted above the packed bed and is known as a liquid "distributor." Other operations require a column having more than one packed bed. In such an instance the column requires additional distributing devices which are positioned between the packed sections. The additional distributing devices are known as liquid "redistributors."

There are two general types of conventional liquid distributors on the market today. The first is the orifice type, which is characterized by head-driven flow through orifices, tubes, or nozzles which are located in the bottom of a pan, trough, or pipe. Examples of this type include distributors having orifice plates, perforated pipes, or spray nozzles.

Other conventional liquid distributors are of the overflow weir type. These distributors are characterized by flow-through weirs cut into the tops or sides of tubes set in the bottom of a pan, or weirs cut into the wall of troughs laid out in a ladder pattern. The weir design is known for its minimal tendency to foul owing to the self-cleaning nature of the weirs. In a typical vapor-liquid contact operation, the liquid distributor of this type provides for the liquid to enter the tubes or troughs. As the liquid overflows the weirs it falls onto the packing in the column. Vapor entering the bottom of the column rises up through the packing, where it contacts the downflowing liquid.

However, a number of problems are encountered in the use of these known distributing devices. First of all, the function of the distributors and redistributors in vapor-liquid contact operations is to ensure uniform liquid distribution across the cross-section of the tower. Uneven liquid distribution is referred to as "maldistribution." Maldistribution results in a reduced transfer of mass and/or heat between the vapor and liquid phases, which consequently can result in poor separation of components in the column. It can have other detrimental effects as well, such as material decomposition in processes which utilize temperature-sensitive liquids as reactants.

Maldistribution is a particularly common problem when the conventionally used distributors are used in packed columns having large diameters, that is, greater than about eighteen inches, due to the sensitivity to leveling. This problem is particularly acute in operations such as vacuum fractionation, where the liquid loading per cross-sectional area of the column is low. In the larger columns the longer span of the weir-type or orifice type system makes it much more difficult to maintain a level position, particularly since most distributor systems are not precisely level even when first installed. Later, as the column shifts, the distributors become even further out of level. In a system which is not level, the liquid collects at the lower end of the trough or tube and the higher end is thus "starved" for liquid.

A second problem encountered is that of fouling. While this is generally not a problem with the weir-type devices, it can present major difficulties in an orifice-type system. This is particularly so in processes such as vacuum fractionation, and other operations which require a low flow rate of liquid from the distributor to the packing, because for these applications the liquid must drain through very small orifices. Solids in the liquid often plug these drain orifices, requiring time-consuming and expensive servicing, and resulting in poor operation while plugged. Plugging problems are also encountered in designing systems that are less sensitive to leveling. For this also it is necessary to use very small orifices—often less than ¼ inch in diameter—in order to ensure a sufficiently high liquid head, which in turn operates to reduce maldistribution problems.

Finally, there is often a problem in efficient use of space. High turndown/turnup ratios, i.e., large differences between the minimum and maximum liquid flow rates, necessitate additional liquid head. This is shown by the orifice equation:

$$q = CA(2gh)^{0.5}$$

In the above equation q is the fluid flow rate in cubic feet per second, C is the dimensionless orifice coefficient for the particular orifice being used, A is the flow area of the orifice in square feet, g is the acceleration due to gravity (32.2 feet per second per second), and h is the height of fluid held up over the orifice in feet of flowing fluid, i.e., the head. From this equation it is seen that as the flow rate changes, the head must also change. This change is proportional: The head required at maximum flow is equal to the head at minimum flow multiplied by the square of the turndown/turnup ratio. Thus, for example, if a 2 inch head is to be maintained at minimum flow and there is a turndown/turnup ratio of 3:1, the head required at maximum flow would be 18 inches. However, because of this relationship serious problems arise particularly as to the redistributors, since in a packed column even relatively small reductions in packed space can significantly reduce column efficiency, and it is not always possible to simply enlarge the column.

Solutions or improvements to some of the above-noted problems have been provided by the invention described in U.S. Pat. No. 4,472,325, entitled "Liquid Distributor Apparatus for a Vapor-Liquid Contact Column." That invention consists of a distributor unit and a parting manifold which operate together to maximize uniform distribution, even at very low flows, while reducing fouling problems. The distributor unit is generally a plate with upstanding walls positioned crosswise and lengthwise to define separate, open-top compartments. Installed in each compartment are a number of drip tubes which extend above and below the plate.

Gas riser openings are positioned between certain compartments, and the distributor unit is mounted inside the column above the packed bed. The parting manifold is mounted above the distributor unit, and includes a header circuit, crosswise end conduits, a crosswise lateral conduit, and a vertical standpipe conduit. The end conduits and lateral conduit have closed ends and each lateral includes outlet ports therein. The downflowing liquid enters the manifold though the standpipe conduit, drops through the outlet ports into each compartment, and flows downwardly through the drip tubes onto the packing.

That invention solves or reduces the first problem above, namely that of leveling and resultant "starvation" of one portion of the column. However, it still has a number of problems. Plugging of the orifices of the parting manifold can still occur, requiring expensive cleaning and servicing. The servicing is complicated by the fact that the parting manifold generally is hard-piped, and must be dismantled for cleaning and then reinstalled. Furthermore, that invention does not address the problems resulting from high turndown ratios. It is still necessary to maintain a substantially increased liquid headtto accomodate the high turndown ratio, and this in turn reduces the efficiency of the column and/or necessitates substantial design modifications.

In view of the unsatisfactory nature of prior liquid distributors, it would be desirable to have a distributor which would better address the problems of high turndown ratios, difficult servicing, fouling, and maldistribution.

SUMMARY OF THE INVENTION

Accordingly, the present invention addresses these and other problems by providing an improvement in an apparatus for distributing a downflowing liquid in a vapor-liquid contact column, the apparatus comprising a lower distributor unit comprising a means for distributing fluid flow uniformly across the packed bed of the vapor-liquid contact column, the improvement comprising a predistributor unit comprising a plate and an upstanding wall member fastened along one edge to the plate and defining the periphery of the plate such that an open-top compartment is formed, a first plurality of drip tubes being installed in the compartment, the drip tubes being defined by upstanding tubular members which extend above and below the plate and which are fastened to the plate, each drip tube having at least one lengthwise slot therein that extends from the plate to the top of the drip tube; the predistributor unit being mounted horizontally inside the column above the packed bed, such that the predistributor unit is oriented above the lower distributor unit, and at least one of the predistributor unit's drip tubes is in liquid connection with the lower distributor unit; wherein the downflowing liquid enters the predistributor unit, flows downwardly through the drip tubes therein into the lower distributor unit, and then flows downwardly onto the packed bed.

The present invention also provides an apparatus for distributing a downflowing liquid uniformly across the packed bed of a vapor-liquid contact column. A specific embodiment of the apparatus comprises a predistributor unit comprising a plate and an upstanding wall member fastened along one edge to the plate and defining the periphery of the plate such that an open-top compartment is formed, a first plurality of drip tubes being installed in the compartment, the drip tubes being defined by upstanding tubular members which extend above and below the plate and which are fastened to the plate, each drip tube having at least one lengthwise slot therein that extends from the plate to the top of the drip tube; and a lower distributor unit comprising a plate and a plurality of upstanding wall members, the wall members being fastened along one edge to the plate, one upstanding wall member defining the periphery of the plate and the other wall members being positioned crosswise and lengthwise of the plate to define separate, open-top compartments within the lower distributor unit, a second plurality of drip tubes being installed in each compartment, the drip tubes being defined by upstanding tubular members which extend above and below the plate and which are fastened to the plate; the predistributor unit and lower distributor unit being mounted horizontally inside the column above the packed bed, such that the predistributor unit is oriented above the lower distributor unit, and at least one of the first plurality of drip tubes is in liquid connection with each compartment of the lower distributor unit; the apparatus further comprising a plurality of gas risers in the plate of the lower distributor unit, the risers being defined by openings located in the plate; wherein, the downflowing liquid enters the predistributor unit, flows downwardly through the first plurality of drip tubes therein into the lower distributor unit, and then flows downwardly through the second plurality of drip tubes therein onto the packed bed.

DESCRIPTION OF THE PREFERRED EMBODIMENTS

Figure 1:
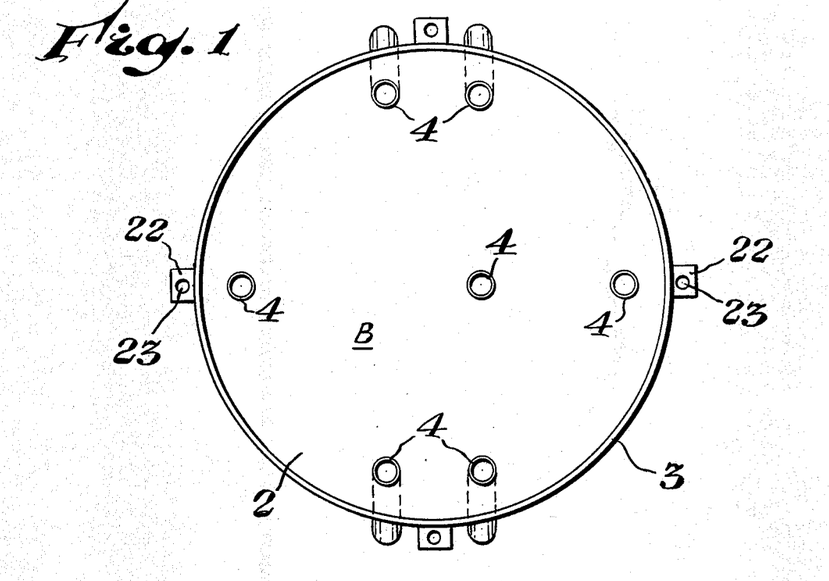
FIG. 1 is a plan view, partly in section, of one embodiment of the predistributor unit of the liquid distributor apparatus of this invention.

Referring to the drawings, particularly FIG. 1, one embodiment of the distributor apparatus of this invention is generally made up of two components, namely, a predistributor unit and a lower distributor unit. The predistributor unit comprises a bottom defined by a flat, generally circular plate 2 and a single upstanding wall 3 which defines the periphery of the plate. Thus, an open-top compartment is formed. This compartment is designated by the letter B. There is at least one, and preferably several, drip tubes 4 installed in compartment B. These drip tubes are defined by upstanding tubular members which extend above and below the plate 2 and which are fastened into the plate.

Figure 2:
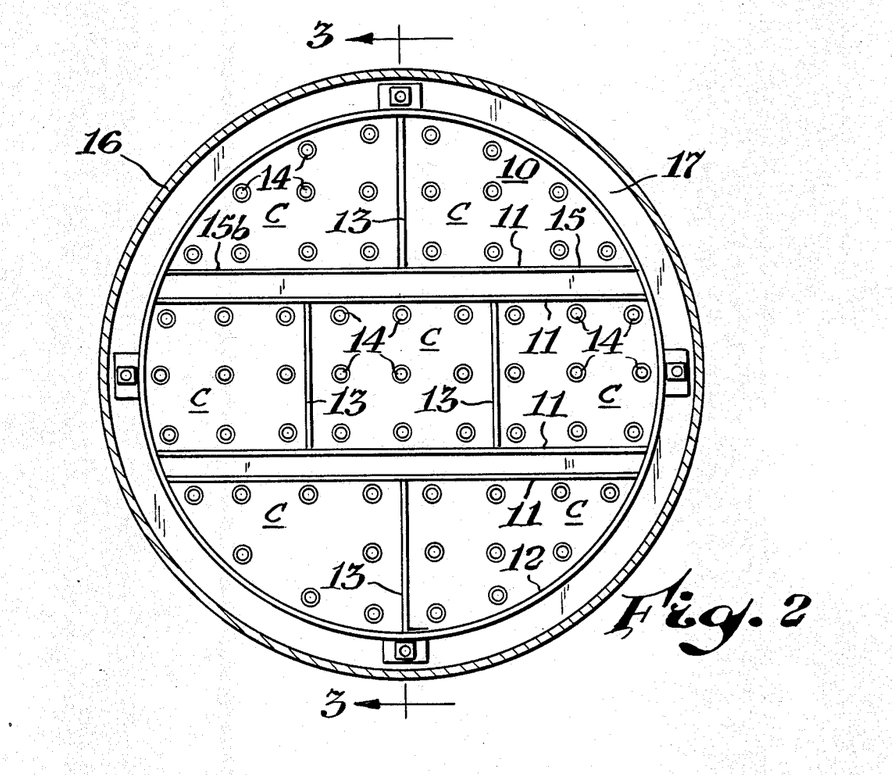
FIG. 2 is a plan view, partly in section, of the lower distributor unit of the liquid distributor apparatus of this invention.

FIG. 2 illustrates one embodiment of a lower distributor unit, similarly comprising a bottom defined by a flat, generally circular plate 10. Several upstanding wall members are fastened to the top surface of the plate 10, along the bottom edge of each of the wall members. Some of the wall members, indicated by numeral 11, are positioned crosswise of plate 10. These walls are joined at each end to a single upstanding wall 12, which defines the periphery of plate 10.

The other upstanding wall members in the lower distributor unit, indicated as 13, are positioned lengthwise of plate 10. As shown in FIG. 1, two of the walls 13 are fastened at one end into the peripheral wall 12, and at the other end into one of the inside walls 11. The other two walls 13 fasten at each end into the remaining inside walls 11. The lengthwise and crosswise arrangement of walls 11 and 13 thus define several open-top compartments in the lower distributor unit. Each of these compartments is designated by the letter C.

At least one drip tube 14 is installed in each of the compartments. These drip tubes are defined by upstanding tubular members which extend above and below the plate 10 and are fastened into the plate. It is preferred that there be an equal number of drip tubes uniformly distributed within each compartment, or in general it is preferred that there be from about 5 to about 10 drip tubes per square foot of area whether or not the lower distributor unit is compartmented. While it is possible to have only one drip tube to a compartment, optimum distribution of liquid can be attained when a sufficient number of distribution points are utilized.

Plate 10 also has at least one rectangular opening 15 therein, which operates as a gas riser. An annular gas riser is also provided by an annular space 5a (FIG. 3), which is defined between the outer wall surface of the peripheral wall 12 and the inner wall surface of the column 16. The total space allotted to risers is preferably sufficient to minimize or eliminate any pressure drop across the distributor resulting from the rising gas. At least one large-mesh screen 15b can preferably be fastened to the underside of plate 10, such that it covers the gas riser openings 15. These pieces prevent migration of the packing up through the risers 15 and 15a in certain applications; however, the screen is generally not needed when structured packings are used. Another large-mesh screen 15c (FIG. 3) is preferably fastened to the periphery of plate 10, such that it hangs straight down from the plate. This piece prevents the packing in the packed bed from migrating into the annular riser 15a.

Figure 3:
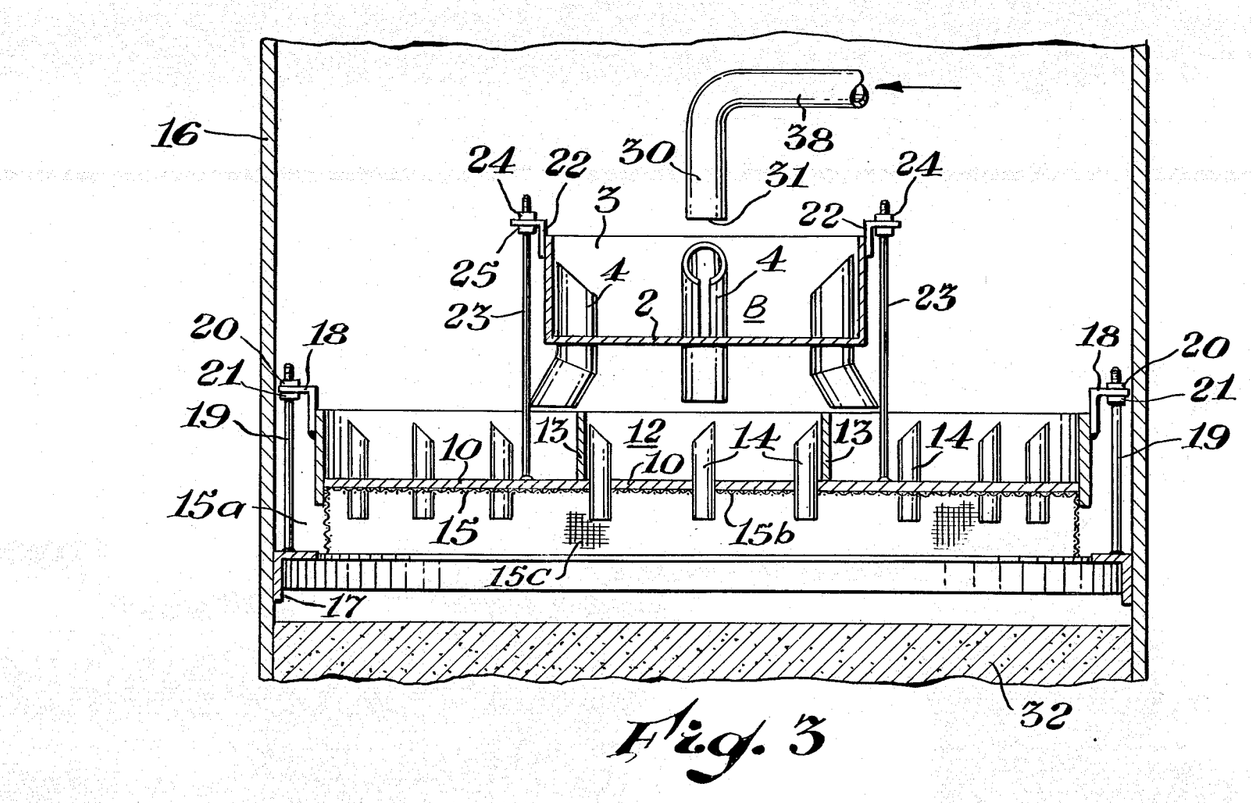
FIG. 3 is an elevation view, partly in section, of the distributing apparatus that includes the combination of the predistributor unit and the lower distributor unit.

A support ring 17, which is welded to the inside wall surface of column 16, provides a means for supporting the lower distributor unit. Alternatively, other means of suspension or support can be employed. Referring particularly to FIG. 3, a number of leveling lugs 18 are welded to the outside surface of the peripheral wall 12 at the top of this wall. The lugs fit down over threaded hold-down bolts 19, which are welded to the support ring 17. Each leveling lug is secured to its corresponding hold-down bolt by a pair of nuts 20 and 21, which are positioned on opposite sides of the lug to provide for raising or lowering the lower distributor unit to make it level.

The predistributor unit is also provided with leveling lugs 22, which fit down over threaded hold-down bolts 23 (FIG. 3). The hold-down bolts 23 can serve to support the predistributor unit over the lower distributor unit, and can be tack-welded to the surface of the plate 10. Nuts 24 and 25, positioned on opposite sides of the lug to provide for raising and lowering the upper distributor unit, are used to secure each leveling lug to its corresponding hold-down bolt.

In general, and as shown in FIG. 3, the predistributor unit is oriented above the lower distributor unit. Both the predistributor and the lower distributor unit are oriented so that the compartments are open at the top, and the drip tubes of the predistributor unit serve to feed the desired liquid into the compartments of the lower distributor unit. For this step it is preferred that there be one drip tube in the upper distributor unit in liquid connection with each compartment in the lower distributor unit; however, a plurality of drip tubes in the predistributor unit can be each arrayed in liquid connection with each compartment of the lower distributor unit. If more than one drip tube is used to feed each compartment in the lower distributor unit, it is preferable that an equal number of tubes be used for each compartment.

It is preferred that the predistributor unit be of a significantly smaller diameter than the lower distributor unit, as shown in FIG. 3, allowing for minimal design considerations. There are two reasons for this: (1) Small size will reduce leveling problems in the predistributor; and (2) small size allows for free gas flow above the lower distributor unit. In general, it is preferred that the predistributor be a maximum of about 20 inches in diameter. Because of the smaller size, the predistributor generally does not need gas risers of any type, although these can be incorporated, e.g., an annular gas riser, if desired.

It is also preferred that all drip tubes, and particularly those in the predistributor unit, be about the same size, both in diameter and in height both above the plate and below the plate. This uniformity of construction increases the uniformity of liquid flow, owing to similar volumes and friction levels. However, as shown in FIG. 3, where there is a substantial difference in diameter between the predistributor unit and the lower distributor unit, it may be necessary to extend the connection between some drip tubes and the compartments of the lower distributor unit which they feed. In this case it is preferable to use open troughs 5, rather than tubes of any type. As shown the troughs should extend from the bottom of the predistributor's drip tubes to the compartments. The advantage of these open troughs is that they do not affect the liquid head in the drip tubes. The lower portion of the drip tubes can be modified as desired, for example, with a bend as shown in FIG. 3, to better direct the flow.

A standpipe conduit 30 is located such that liquid can pass through it, exit through outlet 31, and enter into the open-top compartment B of the upper distributor unit. The upper distributor unit and the lower distributor unit are both oriented above the packed bed 32 in the column 16. FIG. 3 shows the distributor apparatus positioned at the top of the column, a position which corresponds to the top distributor in FIG. 6.

Figures 4, 5, 6:
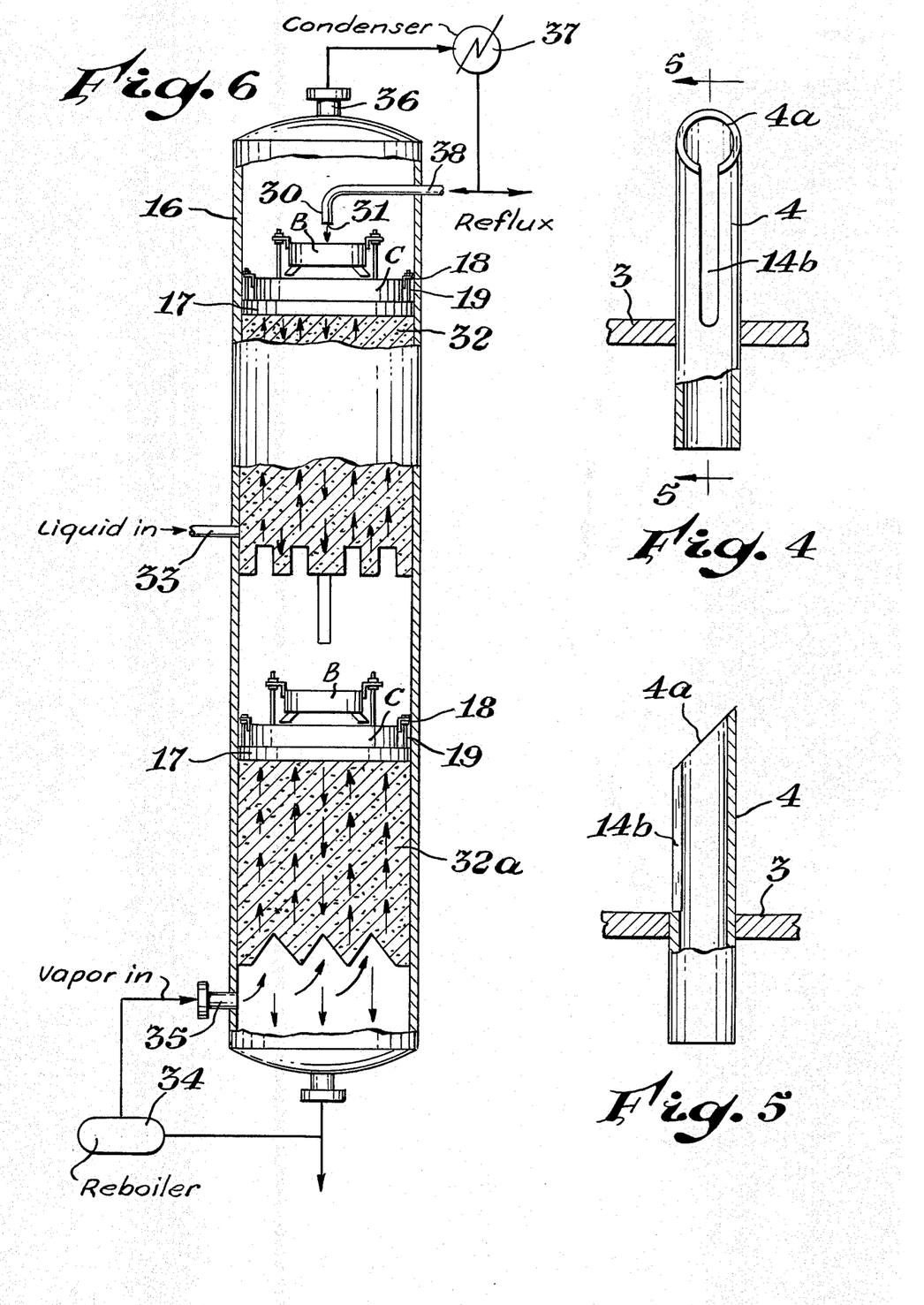
FIG. 4 is a detail view of one of the drip tube components of the distributing apparatus illustrated in FIGS. 1, 2 and 3. This view is taken on the front side of the drip tube.
FIG. 5 is another detail view of the drip tube component shown in FIG. 4, with this view being taken along line 5—5.
FIG. 6 is a schematic view of a packed column, in which are installed two of the distributor devices of this invention. In this view the device at the top of the column is utilized as a liquid distributor and the device located farther down in the column functions as a liquid redistributor.

As illustrated in FIGS. 4 and 5, the top end 4a of each of the drip tubes 4 is slanted in relation to the top surface of first plate 2 and second plate 10. Also, each drip tube has a lengthwise slot 14b therein, which extends from the lowest point on the top end of the tube down to the top surface of plate 10. The top end 14a of drip tubes 14 is also slanted. The slanted top end, in combination with the lengthwise slot, makes each drip tube a structure having a compound weir effect.

The liquid distributing apparatus of this invention has certain features which give it a distinct advantage over most of the commercially available devices. A primary advantage is that the problems associated with high turndown ratios are substantially reduced. When the predistributor unit of the present invention is used, either with a conventionally known distributor or in conjunction with the lower distributor unit described in one embodiment of the present invention, the prohibitively large increases in height of liquid head are made unnecessary, because the drip tubes of the predistributor unit can be sized in order to accomodate the fastest and slowest applicable flow rates. This means that the internal diameters of the tubes are calculated to accomodate the maximum flow at which the head height is at its allowed maximum, and the slot widths are calculated to accomodate minimum flow, i.e., to ensure that there is a sufficient liquid level in the predistributor's tray so that all tubes are receiving flow. As noted earlier, the internal diameter is based on the orifice equation calculations, while the slot width is based on a modified orifice equation which varies according to the shape of the slot. For example, for rectangular slots the equation is $$q = 0.386 w (2g)^{0.5} (h)^{1.5},$$

in which w is the width of the slot in feet, and q, g, and h are the same as described earlier. In contrast, for V-notch slots the relation is described by the equation $$q = 0.31 \tan(A/2)(2g)^{0.5}(h)^{2.5},$$

where A is the angle at the bottom of the V-notch.

Because of the reduced liquid head requirements, it is possible to increase the packed area in a given column since the linear space needed for distributors and redistributors is reduced. This increased packed area can increase the operational efficiency of the column. Alternatively, it is also possible to reduce the overall column height in designing and building ne columns.

For example, if a 36" diameter column with 2 feet of space between packed sections is subjected to flows ranging from about 8 to 35 gpm, the turndown ratio is about 4.37 to 1. If an orifice type parting manifold, as described in U.S. Pat. No. 4,472,325, is used and designed for 4 inches of minimum liquid head at 8 gpm, the space required for liquid head at 35 gpm would be 76 inches, which is generally a prohibitively large amount of space. The orifice size to maintain about a 4 inch head would be about ⅜ inch. However, using the two-tiered distributor apparatus of the present invention, with its weir-type predistributor unit having 4 inch high tubes and ¼ inch weir slots, only about 3.7 inches of head would result at maximum flow, and a 1.37 inch head would still be maintained at minimum flow.

The present distributing apparatus thus has two primary embodiments, one in which the predistributor described is used in conjunction with any known lower distributor unit, and one in which the predistributor unit is used in conjunction with the unit disclosed in U.S. Pat. No. 4,472,325. In this second embodiment it also obtains the advantages of a compartmented structure in the lower distributor unit. This compartmented structure further reduces the maldistribution problem encountered in large (particularly over 18-inch) diameter columns, wherein leveling is more difficult. Because of this feature, the present distributor apparatus can be used for operations which require alternatively high liquid loading and low liquid loading, based on the cross-sectional area of the column. The capability of this apparatus to uniformly distribute the liquid in a low loading situation and where there are significant turndown/turnup ratios is particularly significant, since most of the prior distributor devices are not satisfactory for such operations.

Another advantage achieved by the present invention is that the tubes and the weirs (slots) in the predistributor unit allow small solid particles to pass through without plugging or clogging. These clogging problems can lead to maldistribution and cleaning difficulties, such as are encountered in using the orifice type parting manifold of U.S. Pat. No. 4,472,325, as well as other orifice-type distribution apparatus. The weirs or slots in the drip tubes also offer another advantage, in that the distributor of the present invention can be drained free of liquid when the vapor-liquid contact operation is shut down. This feature helps to prevent unintentional contamination of the maintenance personnel.

Finally, initial installation and servicing are greatly facilitated because of the tray-type predistributor unit. This tray-type unit can be fed by any of various open downcomer-type connections, and does not need to be hard-piped as is the case with the parting manifold of U.S. Pat. No. 4,472,325 and other conventional distribution apparatus. Because of this, the need for dismantlement of portions of the distributor apparatus and even of the column is minimized, and servicing is faster and more convenient.

OPERATION

The invention can be illustrated by describing a typical operation in which the present distributing apparatus is used in a packed column for a distillation operation. In the distillation operation, which is illustrated schematically in FIG. 6, a distributor apparatus is used at the top of the column as a liquid distributor, but farther down in the column the same apparatus functions as a liquid redistributor. For the purpose of this description, assume that the liquid feed stream is a solution of ethanol in water, and that the distillation operation is continuous (as opposed to a batch procedure).

During the operation, the liquid reflux stream enters column 16 through the reflux inlet 38 and and passes through conduit 30 into predistributor unit compartment B. It then passes through the drip tubes 4 of the predistributor unit and then through drip tubes 14 located in compartment C of the lower distributor unit, then trickles through the packing in the upper bed 32. At the bottom of bed 32, which is referred to as the rectification section, the downwardly moving liquid is collected, mixed with the liquid feed which enters the column through inlet 33, and directed into the conduit 30 of the redistributor apparatus positioned below this packed section. The liquid then passes first into the drip tubes 4 located in compartment B of this second predistributor unit, then through drip tubes 14 located in compartment C of the second lower distributor unit, and flows downwardly through the lower packed bed 32a, referred to as the stripping section. It finally flows to the bottom of the column. Part of the bottom's liquid is directed into a reboiler 34 and vaporized. The vapor phase is carried back into the column through the inlet 35 and it moves upwardly in the column through both of the packed beds 32a and 32.

At the top of the column the overhead vapors are carried out of the column through outlet 36 and into condenser 37. The condensed vapors provide part of the reflux liquid, which is returned to the column through reflux line 38. The reflux liquid enters the distributor apparatus onto the upper packed bed. As the liquid trickles down through the rectification section (bed 32) and stripping section (bed 32a) of the column, it is moving counter-current to the vapor phase, which is rising upwardly through the column. The rising vapors strip the ethanol out of the falling liquid and this product, which is rich in ethanol, is carried into the condenser 37. From the condenser the liquid stream is split into reflux, which enters the column through the inlet line 38, and a distillate product stream, which is directed to a receiving vessel (not shown).

EXAMPLE

Three distributor apparatuses of the present invention are installed in a 36 inch diameter packed column. There are two feet of space between each two of the three separate packed sections. The liquid flows in the column range from 8 gpm to 35 gpm. The liquid feed tends to foul.

In this setup there is a turndown ratio of 4.37:1. Using the present apparatus having a predistributor with 4 inch high, slant-top drip tubes having rectangular weir slots of ¼ inch width and an internal diameter of about 1.33 inch, the head in the predistributor at maximum flow will be only about 3.7 inches, while at minimum flow the head will be about 1.37 inch. This design easily fits into the existing column space, offers a non-fouling design, can be easily installed and serviced, and gives good liquid distribution over a wide range of liquid flows.

In contrast, if an orifice type parting manifold is used and designed for 1.37 inches of minimum liquid head, at maximum flow the head would be 26 inches, which is substantially more than the available space. The orifice size for 4 inches of minimum flow would be ⅜ inch, a size likely to encounter fouling problems.

What is claimed is:

1. In an apparatus for distributing a downflowing liquid in a vapor-liquid contact column, the apparatus comprising a lower distributor unit comprising a plate spaced above a packed bed with means for distributing fluid flow uniformly across the packed bed of the vapor-liquid contact column, an improvement comprising:
a predistributor unit comprising a plate and an upstanding wall member fastened along one edge to the plate and defining the periphery of the plate such that an open-top compartment is formed, a plurality of drip tubes being installed in the compartment, the drip tubes being defined by upstanding tubular members which extend above and below the plate and which are fastened to the plate, each drip tube having at least one lengthwise slot therein that extends from the plate to the top of the drip tube;
the predistributor unit being mounted horizontally inside the column above the packed bed, such that the predistributor unit is oriented above the lower distributor unit, and at least one of the predistributor unit's drip tubes is in liquid connection with the lower distributor unit;
wherein the downflowing liquid enters the predistributor unit, flows downwardly through the drip tubes therein into the lower distributor unit, and then flows downwardly onto the packed bed.

2. The apparatus of claim 1 wherein the top of each drip tube defines a surface which is slanted in relation to the top surface of the plate.

3. The apparatus of claim 2 wherein the slot extends to the lowest point of the slanted top.

4. The apparatus of claim 1 wherein the lower distributor unit comprises said plate and a plurality of upstanding wall members, the wall members being fastened along one edge to the plate, one upstanding wall member defining the periphery of the plate and the other wall members being positioned crosswise and lengthwise of the plate to define separate, open-top compartments within the lower distributor unit, a second plurality of drip tubes being installed in each compartment, the drip tubes being defined by upstanding tubular members which extend above and below the plate and which are fastened to the plate.

5. The apparatus of claim 4 wherein each of the second plurality of drip tubes has a lengthwise slot therein, said slot extending from the top surface of the plate to the top end of each drip tube.

6. The apparatus of claim 5 wherein the top of each drip tube defines a surface which is slanted in relation to the top surface of the plate.

7. The apparatus of claim 6 wherein the slot extends to the lowest point of the slanted top.

8. The apparatus of claim 7 in which there are from about 5 to about 10 drip tubes per square foot of area in the lower distributor unit.

9. The apparatus of claim 1 in which the drip tube internal diameter is determined according to the orifice equation $$q = CA(2gh)^{0.5}$$

wherein
q is the maximum fluid flow rate in cubic feet per second,
C is the dimensionless orifice coefficient for the particular orifice being used,
A is the flow area of the orifice in square feet,
g is the acceleration due to gravity,
and h is the height of fluid held up over the orifice in feet.

10. The apparatus of claim 1 in which the slot is a rectangular weir having a width determined according to the equation $$q = 0.386w(2g)^{0.5}(h)^{1.5}$$

wherein
q is the maximum fluid flow rate in cubic feet per second,
w is the width of the slot in feet,
g is the acceleration due to gravity,
and h is the height of fluid held up over the orifice in feet.

11. The apparatus of claim 1 in which the slot is a V-notch weir having a width determined according to the equation $$q = 0.31 \tan(A/2)(2g)^{0.5}(h)^{2.5}$$

wherein
q is the maximum fluid flow rate in cubic feet per second,
A is the angle at the bottom of the V-notch, g is the acceleration due to gravity, and h is the height of fluid held up over the orifice in feet.

12. The apparatus of claim 1 in which the diameter of the predistributor unit is less than the diameter of the lower distributor unit.

13. The apparatus of claim 1 in which the drip tubes in the predistributor unit are positioned such that there is one drip tube in liquid connection with each of a plurality of compartments in the lower distributor unit.

14. The apparatus of claim 13 in which there are an equal plurality of drip tubes located in each compartment of the lower distributor unit.

15. The apparatus of claim 1 in which there is also an annular gas riser opening in the plate of the lower distributor unit defined along the circumference of the plate.

16. The apparatus of claim 1 in which the internal diameter of the drip tubes is calculated to accomodate maximum flow, and the slot width is calculated to maintain a sufficient head at minimum flow to ensure flow to substantially all drip tubes.

17. An apparatus for distributing a downflowing liquid uniformly across the packed bed of a vapor-liquid contact column, the apparatus comprising:

a predistributor unit comprising a plate and an upstanding wall member fastened along one edge to the plate and defining the periphery of the plate such that an open-top compartment is formed, a first plurality of drip tubes being installed in the compartment, the drip tubes being defined by upstanding tubular members which extend above and below the plate and which are fastened to the plate, each drip tube having a lengthwise slot therein that extends from the plate to the top of the drip tube;

and a lower distributor unit comprising a plate and a plurality of upstanding wall members, the wall members being fastened along one edge to the plate, one upstanding wall member defining the periphery of the plate and the other wall members being positioned crosswise and lengthwise of the plate to define separate, open-top compartments within the second distributor unit, a second plurality of drip tubes being installed in each compartment, the drip tubes being defined by upstanding tubular members which extend above and below the plate and which are fastened to the plate;

the predistributor unit and lower distributor unit being munted horizontally inside the column above the packed bed, such that the predistributor unit is oriented above the lower distributor unit, and at least one of the first plurality of drip tubes is in liquid connection with each compartment of the lower distributor unit;

the apparatus further comprising a plurality of gas risers in the plate of the lower distributor unit, the risers being defined by openings located in the plate;

wherein, the downflowing liquid enters the predistributor unit, flows downwardly through the first plurality of drip tubes therei into the lower distributor unit, and then flows downwardly through the second plurality of drip tubes therein onto the packed bed.

18. The apparatus of claim 17 wherein the top of each drip tube defines a surface which is slanted in relation to the top surface of the plate.

19. The apparauus of claim 18 wherein the slot extends to the lowest point of the slanted top.

20. The apparatus of claim 17 in which the drip tube internal diameter is determined according to the orifice equation $$q = CA(2gh)^{0.5}$$

wherein q is the maximum fluid flow rate in cubic feet per second,

C is the dimensionless orifice coefficient for the particular orifice being used, A is the flow area of the orifice in square feet, g is the acceleration due to gravity, and h is the height of fluid held up over the orifice in feet.

21. The apparatus of claim 17 in which the slot is a rectangular weir having a width determined according to the equation $$q = 0.386 w (2g)^{0.5} (h)^{1.5}$$

wherein q is the maximum fluid flow rate in cubic feet per second, w is the width of the slot in feet, g is the acceleration due to gravity, and h is the height of fluid held up over the orifice in feet.

22. The apparatus of claim 17 in which the slot is a V-notch weir having a width determined according to the equation $$q = 0.31 \tan(A/2)(2g)^{0.5}(h)^{2.5}$$

wherein q is the maximum fluid flow rate in cubic feet per second,

A is the angle at the bottom of the V-notch, g is the acceleration due to gravity, and h is the height of fluid held up over the orifice in feet.

23. The apparatus of claim 17 in which the internal diameter of the drip tubes is calculated to accomodate maximum flow, and the slot width is calculated to maintain a sufficient head at minimum flow to ensure flow to substantially all drip tubes.

24. The apparatus of claim 17 in which the drip tubes in the predistributor unit are positioned such that there is one drip tube in liquid connection with each compartment in the lower distributor unit.

25. The apparatus of claim 17 in which there are an equal plurality of drip tubes located in each compartment of the lower distributor unit.

26. The apparatus of claim 17 in which there are from about 5 to about 10 drip tubes per square foot of area in the lower distributor unit.

27. The apparatus of claim 17 in which there is also an annular gas riser opening in the plate of the lower distributor unit defined along the circumference of the plate.

28. The apparatus of claim 17 in which the diameter of the predistributor is less than the diameter of the lower distributor unit.

* * * * *

UNITED STATES PATENT AND TRADEMARK OFFICE
CERTIFICATE OF CORRECTION

PATENT NO. : 4,808,350

DATED : February 28, 1989

INVENTOR(S) : Lanny A. Robbins and George R. Killat

It is certified that error appears in the above-identified patent and that said Letters Patent is hereby corrected as shown below:

Column 3, line 24 please delete "headtto" and insert -- head to --.

Column 5, line 36 please delete "5a" and insert -- 15a --.

Column 7, line 41 please delete "ne" and insert -- new --.

Column 11, line 52 please delete "munted" and insert -- mounted --.

Column 11, line 64 please delete "therei" and insert -- therein --.

Signed and Sealed this

Twenty-third Day of January, 1990

Attest:

JEFFREY M. SAMUELS

*Attesting Officer*   *Acting Commissioner of Patents and Trademarks*